United States Patent
Zhou et al.

(10) Patent No.: US 10,142,070 B1
(45) Date of Patent: Nov. 27, 2018

(54) CELL-SPECIFIC REFERENCE SIGNALS

(71) Applicant: Sprint Spectrum LP, Overland Park, KS (US)

(72) Inventors: Yu Zhou, Herndon, VA (US); Muhammad Ahsan Naim, Ashburn, VA (US); Luca Zappaterra, Eindhoven (NL)

(73) Assignee: Sprint Spectrum L.P., Overland Park, KS (US)

( * ) Notice: Subject to any disclaimer, the term of this patent is extended or adjusted under 35 U.S.C. 154(b) by 172 days.

(21) Appl. No.: 15/235,184

(22) Filed: Aug. 12, 2016

(51) Int. Cl.
*H04L 5/00* (2006.01)
*H04W 72/04* (2009.01)

(52) U.S. Cl.
CPC ............ *H04L 5/0048* (2013.01); *H04L 5/006* (2013.01); *H04L 5/0082* (2013.01); *H04W 72/0446* (2013.01)

(58) Field of Classification Search
None
See application file for complete search history.

(56) References Cited

U.S. PATENT DOCUMENTS

| 9,054,761 | B2 | 6/2015 | Lee et al. | |
| 2010/0303013 | A1* | 12/2010 | Khandekar | H04W 99/00 370/328 |
| 2012/0176982 | A1* | 7/2012 | Zirwas | H04B 7/024 370/329 |
| 2015/0249526 | A1* | 9/2015 | Kim | H04L 5/0051 370/329 |
| 2016/0057742 | A1 | 2/2016 | Berggren et al. | |

* cited by examiner

*Primary Examiner* — Christopher M Crutchfield
*Assistant Examiner* — Thinh D Tran

(57) ABSTRACT

Transmitting downlink reference signals includes transmitting a first plurality of subframes comprising a first reference signal associated with a first antenna port, the first reference signal having a first format within the first plurality of subframes, transmitting a second plurality of subframes comprising a second reference signal associated with a second antenna port, the second reference signal having a second format within the second plurality of subframes, and switching a format of each of the first and second reference signals, such that a third plurality of subframes is transmitted with the first reference signal in the second format, and a fourth plurality of subframes is transmitted with the second reference signal in the first format.

18 Claims, 9 Drawing Sheets

CELL-SPECIFIC REFERENCE SIGNALS

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. The access node may comprise a plurality of antenna ports that may be mapped to a plurality of antennae coupled thereto. Consequently, to enable wireless devices to attach to specific antennae, cell-specific reference signals are transmitted in every subframe and over the entire frequency band deployed by the access node. The cell-specific reference signals correspond to one of the four (or more) cell-specific antenna ports, and are useful for cell initiation or cell search during handover, downlink channel estimation for coherent demodulation/detection at the wireless device, and downlink channel quality measurements in order to derive channel state information for the corresponding antenna ports. Different antenna ports may be configured to transmit subframes with different formats of cell-specific reference signals. In particular, the different formats comprise different densities of reference signals, i.e. a number of reference signals per subframe associated with each antenna port. Overhead restrictions limit the number of resource elements that can be used to transmit reference signals. Using fewer resource elements for reference signals results in less accuracy in channel quality measurement, and can cause wireless devices to use inappropriate demodulation codes.

OVERVIEW

Exemplary embodiments described herein include systems, methods, and processing nodes for transmitting cell-specific reference signals in various formats across a plurality of antenna ports, thereby ensuring that sufficient resource elements are used for transmitting reference signals from each of the plurality of antenna ports. An exemplary method for transmission mode selection includes transmitting a first plurality of subframes comprising a first reference signal associated with a first antenna port, the first reference signal having a first format within the first plurality of subframes, transmitting a second plurality of subframes comprising a second reference signal associated with a second antenna port, the second reference signal having a second format within the second plurality of subframes, and switching a format of each of the first and second reference signals, such that a third plurality of subframes is transmitted with the first reference signal in the second format, and a fourth plurality of subframes is transmitted with the second reference signal in the first format.

An exemplary system for transmitting cell-specific reference signals includes an access node configured with at least four antenna ports, and a processor coupled to the access node, the processor for enabling the access node to perform operations including inserting reference signals using a dense format into odd-numbered subframes of each of a first antenna port and a second antenna port, inserting reference signals using the dense format into even-numbered subframes of each of a third antenna port and a fourth antenna port, and sequentially transmitting the odd and even numbered subframes.

An exemplary processing node for transmitting cell-specific reference signals is configured to perform operations including transmitting a first number of reference signals in each subframe of a first antenna port, determining that a coherence time of the first antenna port falls below a threshold, and transmitting a second number of reference signals in each subframe of the first antenna port, wherein the second number is higher than the first number.

DETAILED DESCRIPTION

Figure 1:
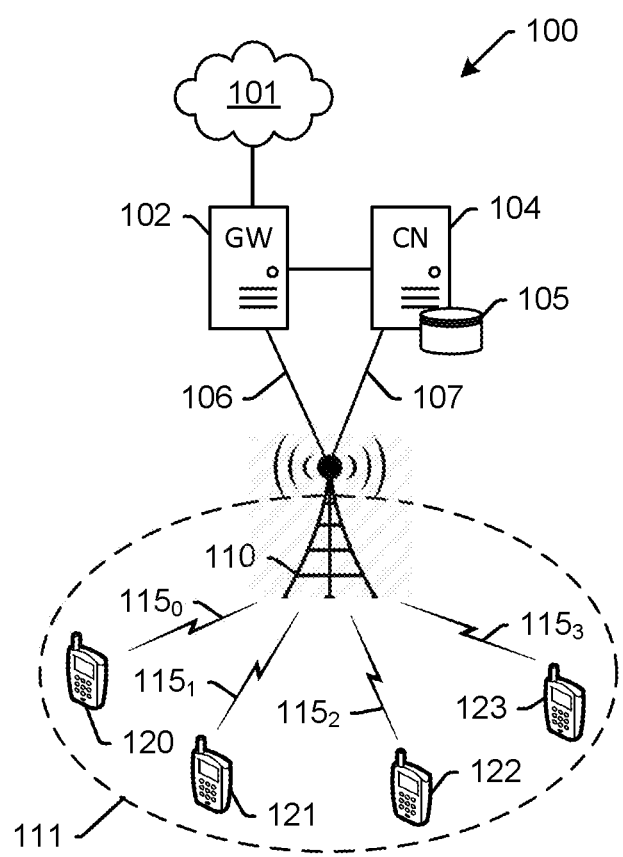
FIG. 1 depicts an exemplary system for transmitting cell-specific reference signals.

In embodiments disclosed herein, cell-specific reference signals associated with a plurality of antenna ports are inserted in various formats into subframes transmitted by each of the plurality of antenna ports. For example, rather than using fixed formats that are pre-assigned to each antenna port of an antenna array (comprising four antenna ports: 0, 1, 2, 3) of an access node, the subject disclosure enables switching formats between cell-specific reference signals transmitted by each antenna port. This balances the number or density of reference-signal-carrying resource elements in subframes transmitted by each antenna port. The switching of formats may occur periodically, for example every x number of subframes transmitted from the antenna ports. The switching is necessary as subframes transmitted from each antenna port reserve some resource elements for reference signals associated with other antenna ports, resulting in a limited number of reference signals per antenna port that may be transmitted without causing interference or excessive overhead.

In one exemplary embodiment, a default transmission framework can include transmitting a first format of reference signals, e.g. a dense format, in all even-numbered subframes transmitted by first and second antenna ports (e.g. antenna ports 0 and 1) and a second format of reference signals, e.g. a sparse format, in all odd-numbered subframes transmitted by the same antenna ports. Similarly, this default transmission framework can further include transmitting the second format of reference signals, e.g. the sparse format, in all even-numbered subframes transmitted by third and fourth antenna ports (e.g. antenna ports 2 and 3) and the first format of reference signals, e.g. the dense format, in all odd-numbered subframes transmitted by the same antenna ports.

Alternatively or in addition, a coherence of each antenna port can be measured at periodic intervals, and the formats can be switched upon the coherence meeting a low threshold, i.e. falling below a minimum acceptable coherence, such that a determination is made that the antenna port with the low coherence requires a denser format of reference signals. For example, an access node may monitor a maximum channel coherence time using channel state indicator (CSI) feedback from wireless devices connected to each antenna port, and sort the coherence time for all antennas periodically. The antenna port(s) with the low coherence are switched to the dense format, and the other antenna port(s) are switched to the sparse format. The switching based on coherence may be performed to override the default periodic switching described above, or independently from the default periodic switching. For example, during initial transmission after a wireless device attaches to a particular antenna port, the channel conditions including channel coherence time on all 4 ports are not well measured, and the periodic switching may be used until the coherence measurements are more mature/reliable, upon which the coherence-based switching is performed.

Further, the reference signal formatting choice can be broadcast using a system information message, such as a SIB message, enabling wireless devices to obtain the reference signals and perform additional operations facilitated by the increased number of resource elements used for transmitting reference signals from each of the plurality of antenna ports. These and additional operations are further described with respect to the embodiments depicted in FIGS. 1-9 below.

FIG. 1 depicts an exemplary system 100 for transmitting cell-specific reference signals. System 100 comprises a communication network 101, gateway 102, controller node 104, access node 110, and wireless devices 120, 121, 122, and 123. Access node 110 is illustrated as having a coverage area 111, with wireless devices 120-123 being located within coverage area 111 and accessing network services from access node 110 respectively using wireless communication links $115_0$, $115_1$, $115_2$, and $115_3$. Each of wireless communication links $115_{0-3}$ corresponds respectively to an antenna port of an antenna system of access node 110. Generally, the term "antenna port" refers to a logical entity versus a physical antenna, and is used to describe signal transmission under identical channel conditions. For example, in an LTE operating mode in the downlink direction for which an independent channel is assumed (e.g. SISO vs. MIMO), a separate logical antenna port is defined. LTE symbols that are transmitted via identical antenna ports are subject to the same channel conditions. In order to determine the characteristic channel for an antenna port, a wireless device must carry out a separate channel estimation for each antenna port. Thus, separate reference signals that are suitable for estimating the respective channel are defined in the LTE standard for each antenna port. See, for example, 3GPP Technical Specification 36.211. For the purposes of this subject disclosure, it will be appreciated that the terms "antenna port" and "antenna" are synonymous, given that logical antenna ports are usually mapped to individual physical antennae, and each antenna port is characterized by its own reference signal.

In operation, one or more of access node 110, controller node 104, or any other network node in system 100 is configured to switch formats between cell-specific reference signals transmitted by each antenna port (not shown) of access node 110. The switching of formats may occur periodically or based on signal conditions, i.e. coherence measured for each antenna port. For example, access node 110 may insert reference signals in one format into subframes transmitted by a first antenna port, e.g. antenna port $115_0$, and in a second format into subframes transmitted by a second antenna port, e.g. antenna port $115_2$. The first format may be a dense format, and the second format may be a sparse format. In other words, the first format may have a greater number of resource elements that carry reference signals than the second format. For example, the dense format includes 8 reference signals within a single subframe, and the sparse format includes 4 reference signals within a single subframe.

As described above, fewer reference signals can negatively affect channel quality measurements of wireless devices attached to the antenna port associated with the reference signals. Consequently, the formats for each antenna port may be switched, enabling subframes transmitted by antenna port $115_2$ to carry a greater number of reference signals than subframes transmitted by antenna port $115_0$. Further, reserved resource elements in each set of subframes (i.e. set of subframes transmitted by a first antenna port versus a second antenna port) may be reconfigured to reflect the switched formats, as described in further detail in FIG. 8. Further, the switching of formats may be performed periodically, i.e. every x number of subframes, or may be based on a coherence measured for each antenna port, such that a determination to switch formats is performed for an antenna port with low coherence. The formatting choice for each antenna port can be broadcast using a system information message, such as a SIB message, or transmitted via wireless communication links $115_{0-3}$, enabling wireless devices 120-123 to obtain the reference signals and perform additional operations such as accurate measurements of channel quality, thereby improving channel coherence.

Access node 110 can be any network node configured to provide communication between end-user wireless devices 120-123 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, or the like. In an exemplary embodiment, a macrocell access node can have a coverage area 111 in the range of approximately five kilometers to thirty five kilometers and an output power in the tens of watts. In other embodiments, access node 110 can be a small access node including a microcell access node, a picocell access node, a femtocell access node, or the like such as a home NodeB or a home eNodeB device. Moreover, it is noted that while access node 110 is illustrated in FIG. 1, any number of access nodes can be implemented within system 100.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access nodes 110 may communicate with other access nodes (not shown) using a direct link such as an X2 link or similar.

Wireless devices 120, 121, 122, 123 may be any device, system, combination of devices, or other such communication platform capable of communicating wirelessly with access node 110 using one or more frequency bands deployed therefrom. Wireless devices 120, 121, 122, 123 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 121, 122, 123, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include S1 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing associations between antenna ports, cell-specific reference signals, and formats thereof. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
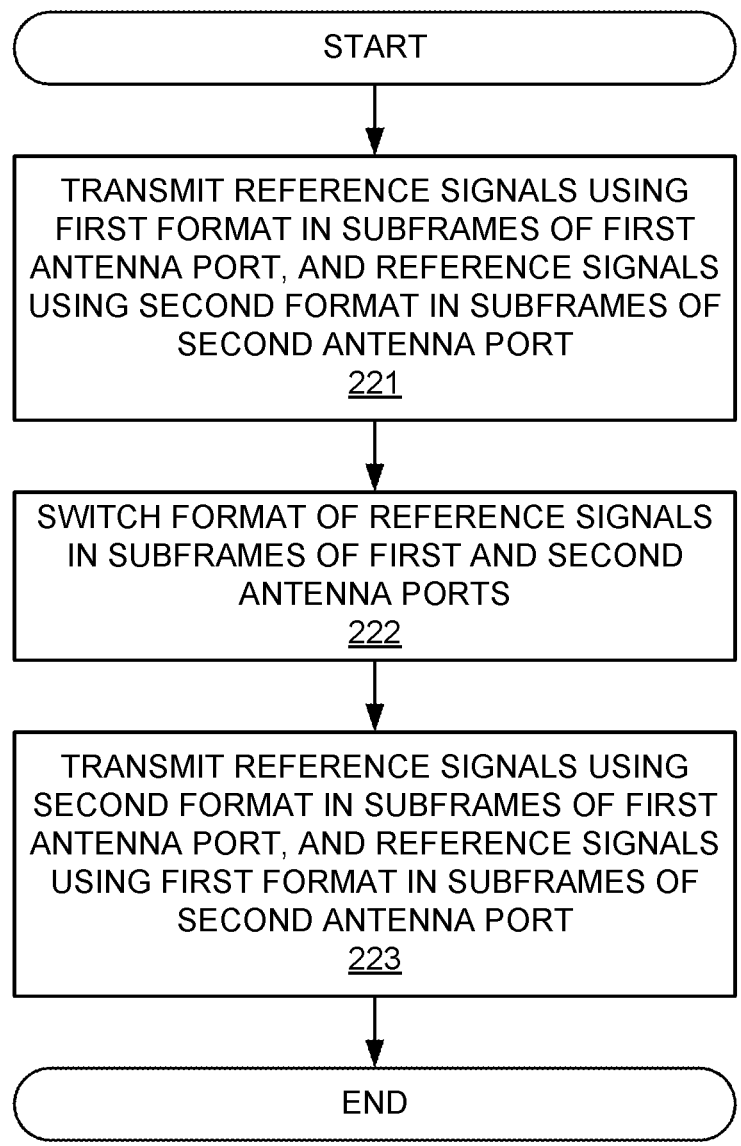
FIG. 2 depicts an exemplary method for transmitting cell-specific reference signals.

FIG. 2 depicts an exemplary method for transmitting cell-specific reference signals. The method of FIG. 2 is illustrated with respect to any network node such as an access node, a controller node, etc. In other embodiments, the method can be implemented with any suitable network element. Although FIG. 2 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 221, reference signals are transmitted using a first format in subframes of a first antenna port, and using a second format in subframes of a second antenna port. The reference signals transmitted for each antenna port are unique to that antenna port. For example in LTE, each reference signal comprises one of 504 unique sequences based on the combination of 3 different two-dimensional orthogonal sequences and 168 different two-dimensional pseudo-random sequences, thereby ensuring different reference signals between different carriers or antenna ports. Moreover, the first format may be denser than the second format, since including a dense format in subframes transmitted by the second antenna port may cause increased overhead, or interference with resource elements carrying reference signals for the first antenna port.

In either case, at 222, the formats are switched such that at 223, reference signals are transmitted using the second format in subframes of the first antenna port, and using the first format in subframes of the second antenna port. In other words, the first antenna port now transmits subframes with a more sparse format of reference signals, while the second antenna port transmits subframes with a more dense format of reference signals. As will be further described with reference to FIGS. 4-7, the switching operation at 222 may be performed in response to determining an expiration of a time period or determining a coherence of an antenna port falling below or decreasing to meet a threshold.

Figure 3:
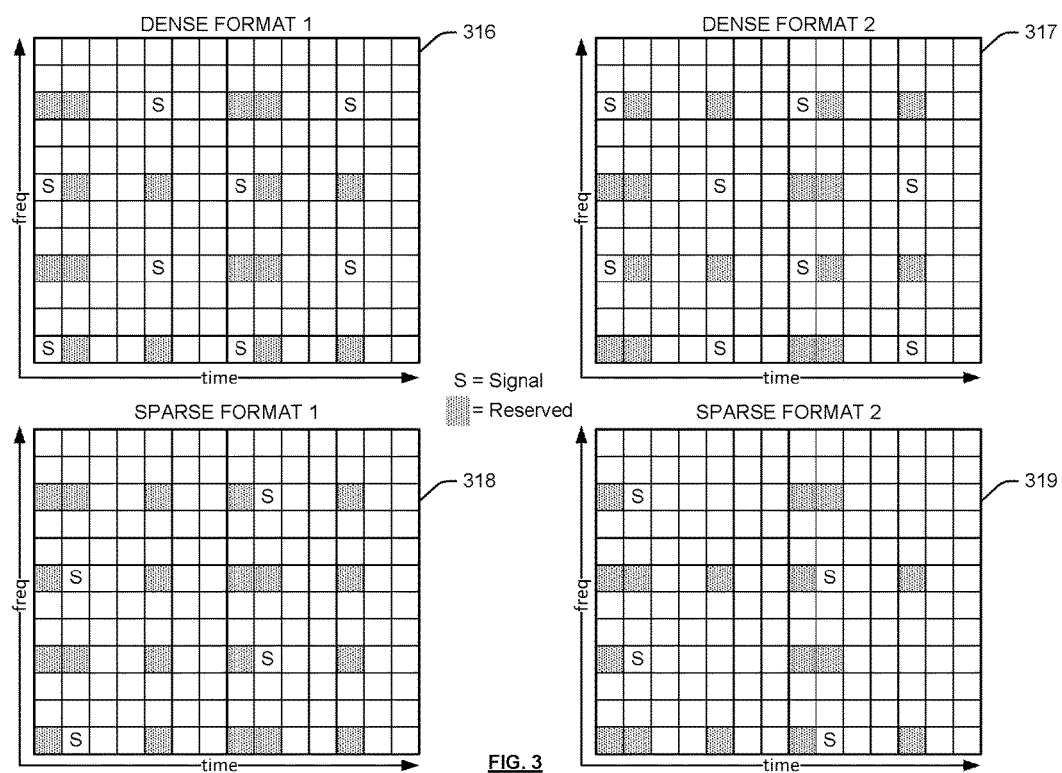
FIG. 3 depicts exemplary formats for inserting cell-specific reference signals into a subframe.

FIG. 3 depicts exemplary formats for inserting cell-specific reference signals into a subframe. Four different subframes 316, 317, 318, and 319 are depicted, each containing a plurality of resource elements that contain either reference signals (indicated by the letter S), reserved for reference signals of another antenna port (indicated by the shaded block), or available for carrying data (blank blocks). Each different subframe 316, 317, 318, 319 is formatted differently. For instance, both subframes 316 and 317 contain different dense formats comprising 8 reference signals in each subframe. It can be seen that if each of subframes 316 and 317 were transmitted simultaneously from two different antenna ports, then there is no conflict of resource elements transmitting reference signals, since each block marked "S" is positioned differently with respect to frequency (indicated by the y-axis) and time (indicated by the x-axis). In other words, the reserved blocks in each subframe enable reference signal transmission by the other subframe.

Similarly, both subframes 318 and 319 contain different sparse formats comprising 4 reference signals in each subframe. It can be seen that if each of subframes 318 and 319 were transmitted simultaneously from two different antenna ports, then there is no conflict of resource elements transmitting reference signals, as the reserved blocks in each subframe enable reference signal transmission by the other subframe. Moreover, given a 4-antenna system, such formatting enables each subframe 316, 317, 318, 319 to be transmitted simultaneously from each of the four antenna ports respectively, with unique resource elements provided for each different reference signal. Resource elements within subframes of a particular antenna port are reserved for reference signals corresponding to other antenna ports, thereby avoiding collision between reference signals and internal antenna interference.

Figure 4:
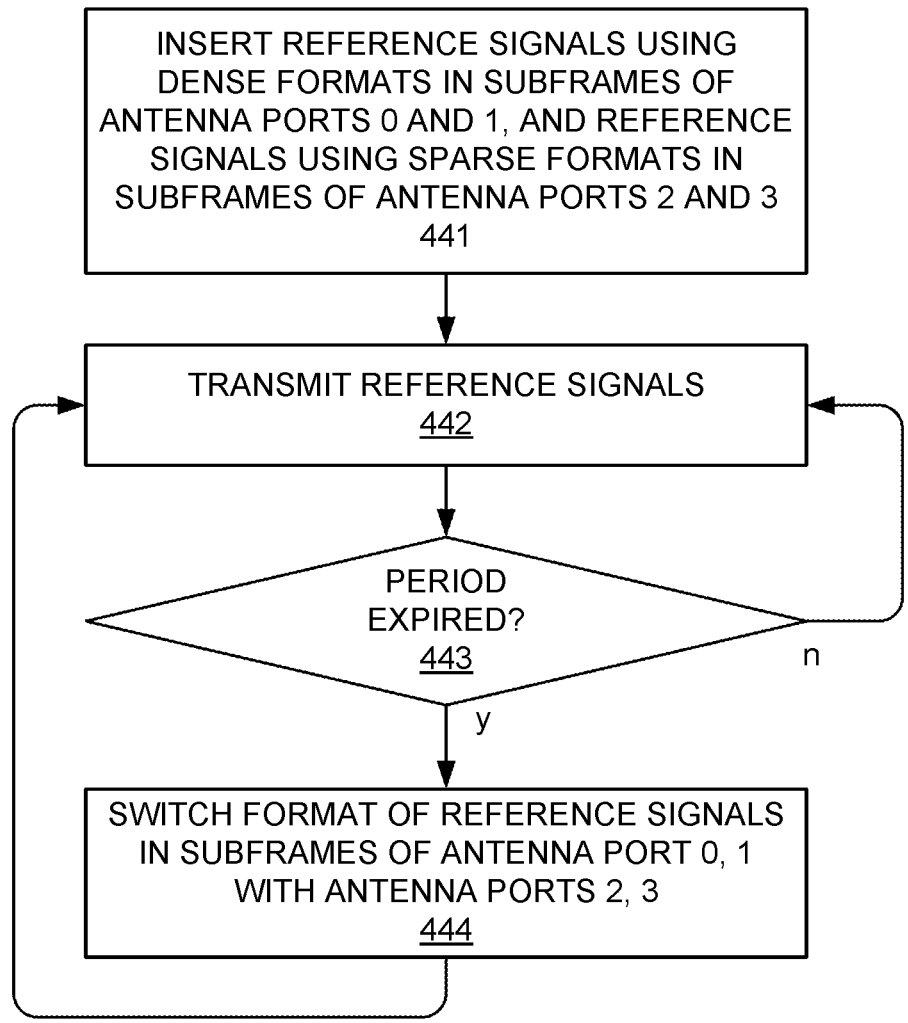
FIG. 4 depicts an exemplary method for periodically switching formats of cell-specific reference signals transmitted from different antenna ports.

FIG. 4 depicts an exemplary method for periodically switching formats of cell-specific reference signals transmitted from different antenna ports. The method of FIG. 4 is illustrated with respect to any network node such as an access node, a controller node, etc. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways. Moreover, the method of FIG. 4 is described with particular reference to a system comprising 4 antenna ports numbered 0, 1, 2, 3, but can be generalized to any number of antenna ports.

At 441, reference signals corresponding to each of antenna ports 0 and 1 are inserted using a dense format in subframes of antenna ports 0 and 1 respectively. The dense format for each antenna port may be one of the two dense formats depicted in FIG. 3, i.e. comprising 8 reference signals per subframe. Consequently, a second (i.e. sparse) format is used to insert reference signals into subframes of antenna ports 2 and 3, such that antenna ports 0, 1, 2, 3 can simultaneously transmit their respective reference signals without causing interference or collision at 442. The reference signals for each antenna port may be transmitted at 442 to wireless devices connected respectively to said each antenna port, and the choice of format for each antenna port may be broadcast in a system information message or similar, enabling additional wireless devices to synchronize their reception of the reference signals.

At 443, a time period is monitored for expiration upon which the formats are switched at 444, such that a sparse format is used to insert reference signals into subframes of antenna ports 0 and 1, and a dense format is used to insert reference signals into subframes of antenna ports 2 and 3. In other words, the first two antenna ports now transmit fewer reference signals per subframe, while the third and fourth antenna ports transmit more reference signals per subframe. As described herein, the period for switching in 443 may be any predefined time period, for example every single subframe. In a similar embodiment, rather than awaiting for a period to expire, alternate-numbered subframes for each antenna port may be configured to use different formats. For example, a dense format of reference signals may be inserted into all even-numbered subframes transmitted by antenna ports 0 and 1, and a sparse format of reference signals inserted into all odd-numbered subframes transmitted by the same antenna ports. Similarly, a sparse format of reference signals may be inserted into all even-numbered subframes transmitted by antenna ports 2 and 3, and a dense format used for all odd-numbered subframes. Other arrangements of periodic format-switching will be appreciated by those having ordinary skill in the art in light of this disclosure.

Figure 5:
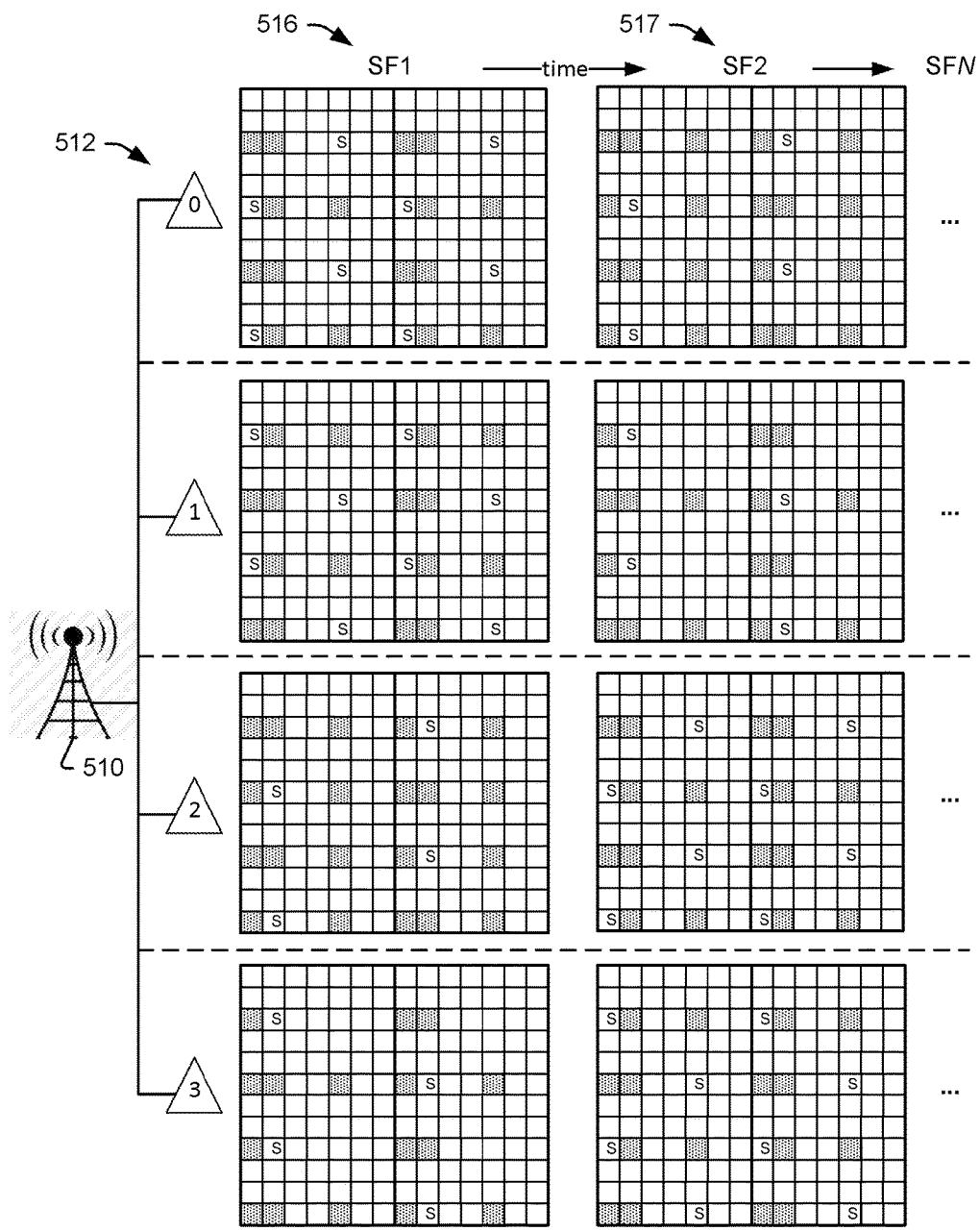
FIG. 5 depicts exemplary subframes with periodically-switched formats of cell-specific reference signals.

FIG. 5 depicts exemplary subframes with periodically-switched formats of cell-specific reference signals. An access node 510 is illustrated as communicatively coupled to four antenna ports 512. Each antenna port 512 is consecutively numbered 0, 1, 2, and 3. Moreover, each antenna port is depicted as transmitting two consecutive subframes SF1 and SF2, indicated by columns 516 and 517 respectively. It will be understood that subframes SF1 and SF2 are consecutive subframes, and subframes SF1 indicated by column 516 are transmitted simultaneously by each of antenna ports 0-3, while subframes SF2 indicated by column 517 are also transmitted simultaneously, subsequent to subframes SF1. Further, each subframe contains a plurality of resource elements that contain either reference signals (indicated by the letter S), reserved for reference signals of another antenna port (indicated by the shaded block), or available for carrying data (blank blocks).

Moreover, each subframe SF1 corresponding to each antenna port 0-3 is formatted differently to ensure unique positioning of reference signals therein. For instance, subframes SF1 of antenna ports 0 and 1 contain different dense formats comprising 8 reference signals in each subframe, and subframes SF1 of antenna ports 2 and 3 contain different sparse formats comprising 4 reference signals in each subframe. It can be seen that if all subframes SF1 were transmitted simultaneously, then there is no conflict of resource elements transmitting reference signals, either in the frequency domain or in the time domain. Further, as time goes by, each subframe SF2 of antenna ports 0 and 1 are switched to contain different sparse formats comprising 4 reference signals in each subframe, and subframes SF2 of antenna ports 2 and 3 are switched to contain different dense formats comprising 8 reference signals in each subframe. Moreover, as time goes by, each alternate subframe SFN is configured with a different format, thereby ensuring that a uniform density of reference signals is transmitted from each antenna port. Although this embodiment describes alternate-numbered subframes for each antenna port being configured to use different formats, other arrangements of periodic format-switching will be appreciated by those having ordinary skill in the art in light of this disclosure.

Figure 6:
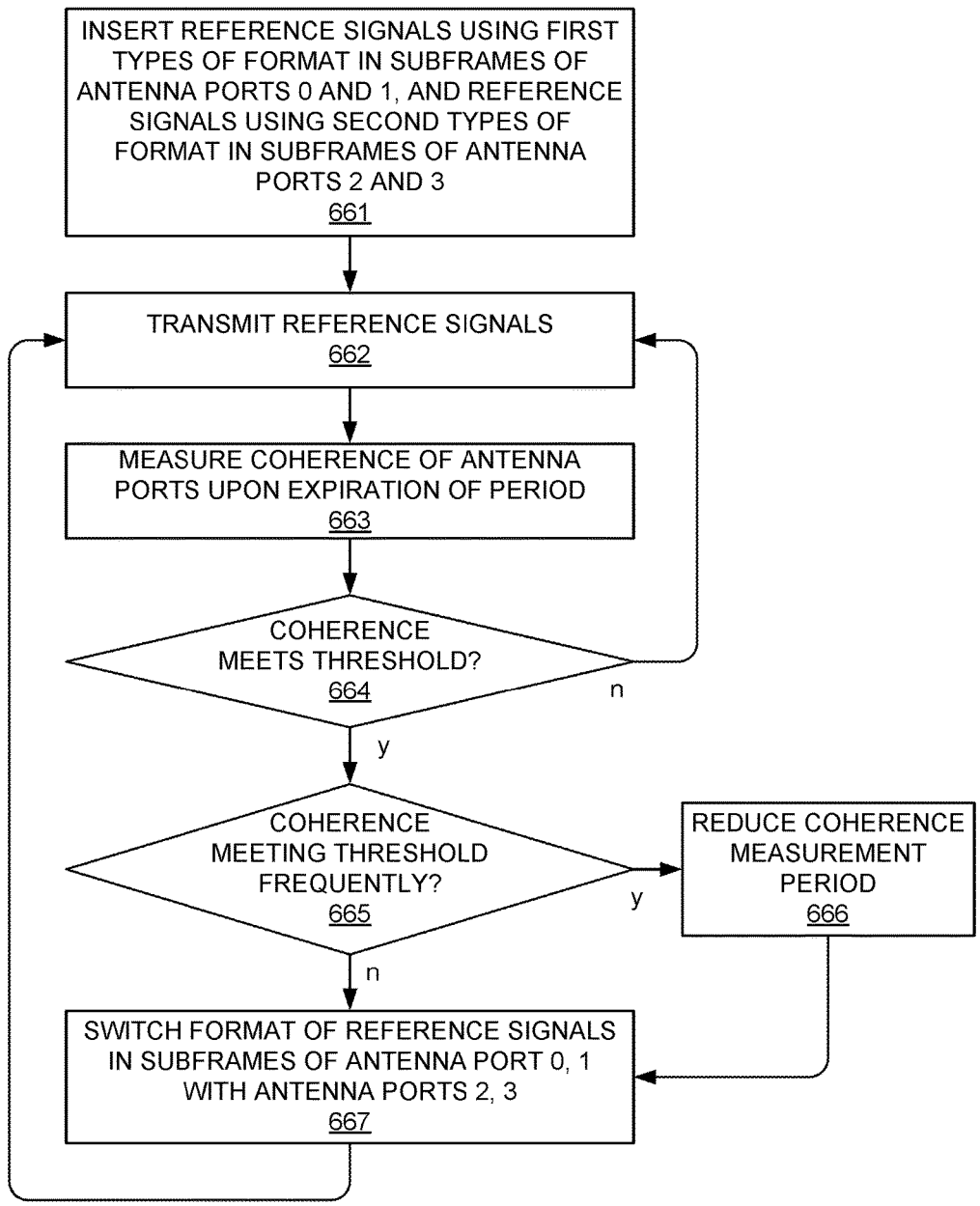
FIG. 6 depicts an exemplary method for switching formats of cell-specific reference signals transmitted from different antenna ports based on a measured coherence of the antenna ports.

FIG. 6 depicts an exemplary method for switching formats of cell-specific reference signals transmitted from different antenna ports based on a measured coherence of the antenna ports. The method of FIG. 6 is illustrated with respect to any network node such as an access node, a controller node, etc. In other embodiments, the method can be implemented with any suitable network element. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways. Moreover, the method of FIG. 6 is described with particular reference to a system comprising 4 antenna ports numbered 0, 1, 2, 3, but can be generalized to any number of antenna ports.

At 661, reference signals corresponding to each of antenna ports 0 and 1 are inserted using a first type of format in subframes of antenna ports 0 and 1 respectively. For example, the first type of format may include the dense formats depicted in FIG. 3, i.e. comprising 8 reference signals per subframe. Consequently, a second type of format is used to insert reference signals into subframes of antenna ports 2 and 3. The second type of format may be one of the two sparse formats depicted in FIG. 3, such that antenna ports 0, 1, 2, 3 can simultaneously transmit their respective reference signals without causing interference or collision at 662. The reference signals for each antenna port may be transmitted at 662 to wireless devices connected respectively to each antenna port, and the choice of format for each antenna port may be broadcast in a system information message or similar, enabling additional wireless devices to synchronize their reception of the reference signals.

At 663, a coherence (i.e. maximum channel coherence time) is periodically measured, and compared with a threshold at 664. For example, the coherence may be monitored a using channel state indicator (CSI) feedback from wireless devices connected to each antenna port. If the coherence of any one (or more) antenna port stays above the threshold at 664, then the transmission continues at 662 using the same formats, and the coherence continues to be monitored at 663. However, if the coherence of any one (or more) antenna port falls below a prescribed amount (or meets a low threshold), then the method proceeds to switching the formats at 667. In an exemplary embodiment, the threshold may be based on a coherence time of another antenna port that is higher than the coherence time being currently measured. For instance, at 663, coherence times for four antennae are measured, and the lowest two coherence times are compared with the highest two coherence times and, if the difference is significant or exceeds a threshold, then the switch may be triggered. Moreover, the frequency of low coherence may be used to trigger an adjustment to the coherence-measuring period at 665-666. For example, if it is determined at 665 that the coherence of one or more antenna ports frequently falls below a threshold, this can indicate that more frequent channel condition measurements are required, thereby triggering a reduction of the coherence measurement period at 666.

In either case, the formats are switched at 667 to reflect the low coherence, such that a sparse format is used for reference signals inserted into subframes of antenna ports 0 and 1, and a dense format is for reference signals inserted into subframes of antenna ports 2 and 3. In other words, the first two antenna ports now transmit fewer reference signals per subframe, while the third and fourth antenna ports transmit more reference signals per subframe. Therefore, third and fourth antenna ports can result in improved coherence times. The method is looped back to transmitting of reference signals 662 and periodic measurement of coherence at 663-664, such that if the coherence of any antenna drops to meet the threshold, the formats are switched.

As described above, the switching based on coherence may be performed in addition to the default periodic switching described in FIGS. 4-5. For example, during initial transmission after a wireless device attaches to a particular antenna port, the channel conditions including channel coherence time on all 4 ports are not well measured, and the periodic switching may be used until the coherence measurements are more mature/reliable, upon which the coherence-based switching is performed. Other arrangements of periodic and coherence-based format-switching will be appreciated by those having ordinary skill in the art in light of this disclosure.

Figure 7:
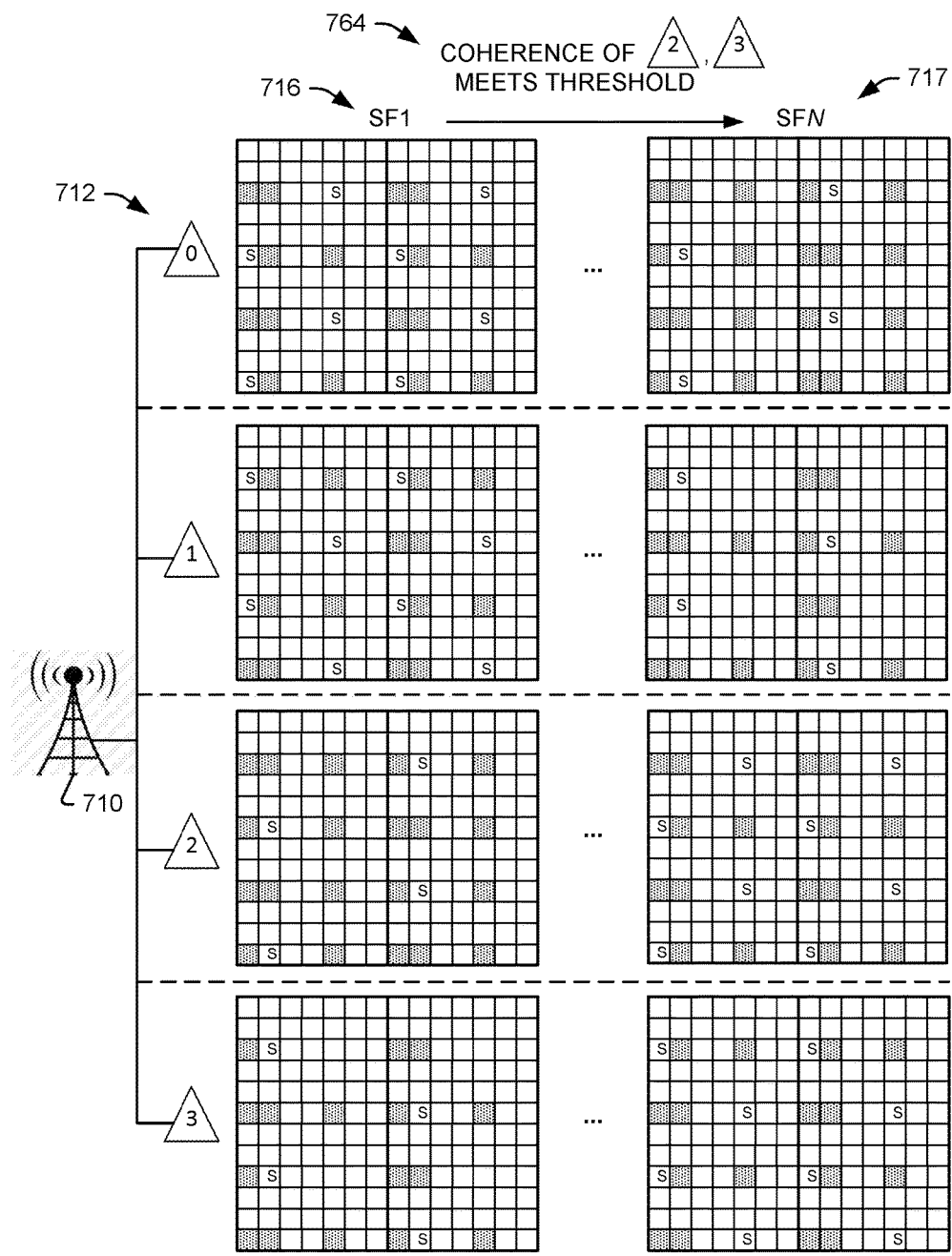
FIG. 7 depicts exemplary subframes with different formats of cell-specific reference signals that are switched based on a measured coherence of the antenna ports.

FIG. 7 depicts exemplary subframes with different formats of cell-specific reference signals that are switched based on a measured coherence of the antenna ports. An access node 710 is illustrated as communicatively coupled to four antenna ports 712. Each antenna port 712 is consecutively numbered 0, 1, 2, and 3. Moreover, each antenna port is depicted as transmitting two subframes SF1 and SFN, indicated by columns 716 and 717 respectively. Similar to the embodiment illustrated in FIG. 5, it will be understood that each subframe contains a plurality of resource elements that contain either reference signals (indicated by the letter S), reserved for reference signals of another antenna port (indicated by the shaded block), or available for carrying data (blank blocks). Moreover, subframes SF1 are transmitted simultaneously by each of antenna ports 0-3, while subframes SFN are also transmitted simultaneously, at some point subsequent to subframes SF1. However, in contrast to subframes SF1 and SF2 of FIG. 5, subframes SF1 and SFN are not consecutive subframes, and subframes SFN depicted by column 717 are transmitted at any time subsequent to subframes SF1, and subsequent to a determination 764 that the coherence of antenna ports 2 and 3 meets a threshold.

In particular, each subframe SF1 corresponding to each antenna port 0-3 is formatted differently to ensure unique positioning of reference signals therein. For instance, subframes SF1 of antenna ports 0 and 1 contain different dense formats comprising 8 reference signals in each subframe, and subframes SF1 of antenna ports 2 and 3 contain different sparse formats comprising 4 reference signals in each subframe. It can be seen that if all subframes SF1 were transmitted simultaneously, then there is no conflict of resource elements transmitting reference signals, either in the frequency domain or in the time domain.

Further, if the coherence of any one (or more) antenna port falls below a prescribed amount (or meets a low threshold), then the formats are switched. For instance, at a point in time between transmittal of subframes SF1 and subframes SFN, a determination 764 is made that the coherence of one of antenna ports 2 or 3 falls to meet a threshold. Consequently, each subframe SFN of antenna ports 0 and 1 are switched to include different sparse formats comprising 4 reference signals in each subframe, and subframes SFN of antenna ports 2 and 3 are switched to contain different dense formats comprising 8 reference signals in each subframe. As a result, antenna ports 2, 3 can see improved coherence times. As described in FIG. 6, the measurement of coherence times continues periodically, and if the coherence of any antenna drops to meet the threshold, the formats are switched again. This ensures that a relatively high density of reference signals is transmitted from each antenna port.

Figure 8:
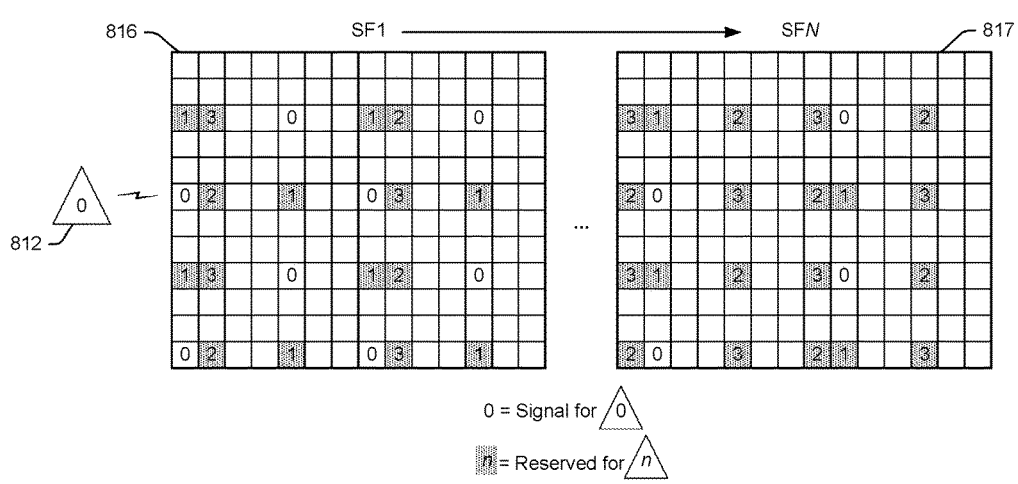
FIG. 8 depicts, in further detail, exemplary subframes with different formats of cell-specific reference signals.

FIG. 8 depicts, in further detail, exemplary subframes 816 and 817 with different formats of cell-specific reference signals. Two subframes 816 and 817 are transmitted from an antenna port 812. Each subframe 817, 817 contains a plurality of resource elements that contain either reference signals (indicated by the 0 corresponding to the antenna port), are reserved for reference signals of another antenna port (indicated by the shaded blocks with antenna port numbers), or are available for carrying data (blank blocks). It can be seen that subframe 816 comprises reference signals 0 in a first dense format, additional reserved resource elements for antenna port 1 in a second dense format, and additional reserved resource elements for antenna ports 2 and 3 in different sparse formats. In other words, 8 resource elements are reserved for reference signal transmissions associated with antenna port 1, and only 4 resource elements are reserved for reference signal transmissions associated with antenna ports 2 and 3. The reserved resource elements are for avoiding collision between reference signals and internal antenna interference.

At some point, either periodically or upon detecting a low coherence for another antenna port, the formatting for subframe 817 (i.e. SF/V) is switched to reflect a sparse format for antenna ports 0, 1 and a dense format for antenna ports 2, 3. In particular, subframe 817 comprises reference signals 0 in a first sparse format, additional reserved resource elements for antenna port 1 in a second sparse format, and additional reserved resource elements for antenna ports 2 and 3 in different dense formats. In other words, only 4 resource elements are reserved for reference signal transmissions associated with antenna port 1, and 8 resource elements are now reserved for reference signal transmissions associated with antenna ports 2 and 3.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 510, 710, controller node 107, and/or network 101.

Figure 9:
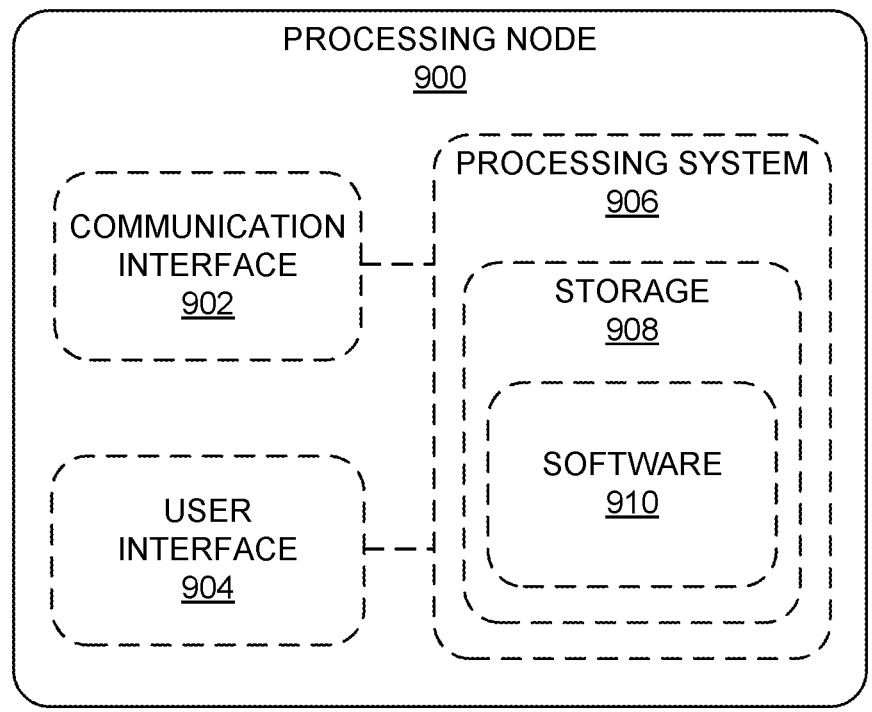
FIG. 9 depicts an exemplary processing node for transmitting cell-specific reference signals.

FIG. 9 depicts an exemplary processing node for data transmission using frame reconfiguration comprising a communication interface 902, user interface 904, and processing system 906 in communication with communication interface 902 and user interface 904. Processing system 906 includes storage 908, which can comprise a disk drive, flash drive, memory circuitry, or other memory device. Storage 908 can store software 910 which is used in the operation of the processing node 900. Storage 908 may include a disk drive, flash drive, data storage circuitry, or some other memory apparatus. For example, storage 908 may include a buffer. Software 910 may include computer programs, firmware, or some other form of machine-readable instructions, including an operating system, utilities, drivers, network interfaces, applications, or some other type of software. For example, software 910 may include a coherence determination module. Processing system 906 may include a microprocessor and other circuitry to retrieve and execute software 910 from storage 908. Processing node 900 may further include other components such as a power management unit, a control interface unit, etc., which are omitted for clarity. Communication interface 902 permits processing node 900 to communicate with other network elements. User interface 904 permits the configuration and control of the operation of processing node 900.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for transmitting downlink reference signals, the method comprising:
   transmitting a first plurality of subframes comprising a first reference signal associated with a first antenna port, the first reference signal having a first format within the first plurality of subframes;
   transmitting a second plurality of subframes comprising a second reference signal associated with a second antenna port, the second reference signal having a second format within the second plurality of subframes;
   detecting that a coherence time of the second antenna port is lower than a coherence time of the first antenna port; and
   in response to the detecting, switching a format of each of the first and second reference signals, such that a third plurality of subframes is transmitted with the first reference signal in the second format, and a fourth plurality of subframes is transmitted with the second reference signal in the first format.

2. The method of claim 1, wherein the switching is performed periodically.

3. The method of claim 2, wherein the period comprises a duration of one subframe, such that the switching is performed every alternate subframe.

4. The method of claim 1, wherein the coherence times of each antenna port are detected based on channel state information associated with each antenna port.

5. The method of claim 1, wherein the detection of the coherence times is repeated at an interval.

6. The method of claim 5, further comprising reducing the period upon detecting that the coherence time of the first or second antenna port falls below a threshold.

7. A system for transmitting downlink reference signals, the system comprising:
   an access node configured with a plurality of antenna ports; and
   a processor coupled to the access node, the processor for enabling the access node to perform operations comprising:
      transmitting a first plurality of subframes comprising a first reference signal associated with a first antenna port, the first reference signal having a first format within the first plurality of subframes;
      transmitting a second plurality of subframes comprising a second reference signal associated with a second antenna port, the second reference signal having a second format within the second plurality of subframes;
      detecting that a coherence time of the second antenna port is lower than a coherence time of the first antenna port; and
      in response to the detecting, switching a format of each of the first and second reference signals, such that a third plurality of subframes is transmitted with the first reference signal in the second format, and a fourth plurality of subframes is transmitted with the second reference signal in the first format.

8. The system of claim 7, wherein the switching is performed periodically.

9. The system of claim 8, wherein the period comprises a duration of one subframe, such that the switching is performed every alternate subframe.

10. The system of claim 7, wherein the coherence times of each antenna port are detected based on channel state information associated with each antenna port.

11. The system of claim 7, wherein the detection of the coherence times is repeated at an interval.

12. The system of claim 11, wherein the operations further comprise reducing the period upon detecting that the coherence time of the first or second antenna port falls below a threshold.

13. A processing node for transmitting reference signals, the processing node being configured to perform operations comprising:
   transmitting a first plurality of subframes comprising a first reference signal associated with a first antenna port, the first reference signal having a first format within the first plurality of subframes;
   transmitting a second plurality of subframes comprising a second reference signal associated with a second antenna port, the second reference signal having a second format within the second plurality of subframes;
   detecting that a coherence time of the second antenna port is lower than a coherence time of the first antenna port; and
   in response to the detecting, switching a format of each of the first and second reference signals, such that a third plurality of subframes is transmitted with the first reference signal in the second format, and a fourth plurality of subframes is transmitted with the second reference signal in the first format.

14. The processing node of claim 13, wherein the switching is performed periodically.

15. The processing node of claim 14, wherein the period comprises a duration of one subframe, such that the switching is performed every alternate subframe.

16. The processing node of claim 13, wherein the coherence times of each antenna port are detected based on channel state information associated with each antenna port.

17. The processing node of claim 13, wherein the detection of the coherence times is repeated at an interval.

18. The processing node of claim 17, wherein the operations further comprise reducing the period upon detecting that the coherence time of the first or second antenna port falls below a threshold.

* * * * *